United States Patent [19]

van Berne et al.

[11] 4,386,484

[45] Jun. 7, 1983

[54] PROCESS AND DEVICE FOR COLLECTING RAINWATER

[75] Inventors: Joost van Berne, Dongen; Franciskus H. van Schaick, Vlaardingen, both of Netherlands

[73] Assignee: Curver, B.V., Rijen, Netherlands

[21] Appl. No.: 217,682

[22] Filed: Dec. 18, 1980

[30] Foreign Application Priority Data

Dec. 19, 1979 [NL] Netherlands ............. 7909176

[51] Int. Cl.³ ............................................. E04D 13/08
[52] U.S. Cl. ............................................. 52/16; 405/119
[58] Field of Search .................... 405/118, 119, 120; 52/14, 16, 11

[56] References Cited

U.S. PATENT DOCUMENTS 1,597,283 8/1926 Murray .................................. 52/16 X

FOREIGN PATENT DOCUMENTS 2301976 7/1974 Fed. Rep. of Germany .......... 52/16
2751471 4/1979 Fed. Rep. of Germany .......... 52/16
2822082 11/1979 Fed. Rep. of Germany .......... 52/16
54-108927 8/1979 Japan ..................................... 52/16

Primary Examiner—David H. Corbin
Attorney, Agent, or Firm—Cushman, Darby & Cushman

[57] ABSTRACT

A process and device for collecting and maintaining fresh amounts of rainwater. The device is comprised of a storage vessel having an inlet passage terminating near the bottom of the vessel, which is further provided with an overflow and a drain. The device possesses a through-pipe which becomes positioned in line with sections of a downspout between which the device can be installed. Water is introduced into the vessel via an upper downspout section and a branch pipe and excess water above the vessel's capacity is discharged via an overflow passage directly into the through-pipe and a lower downspout section. The vessel and its parts are preferably made in one piece by blow-molding a plastic material. The device is substantially intended for collecting small amounts of water.

17 Claims, 3 Drawing Figures

U.S. Patent  Jun. 7, 1983  4,386,484
*Fig. 1*
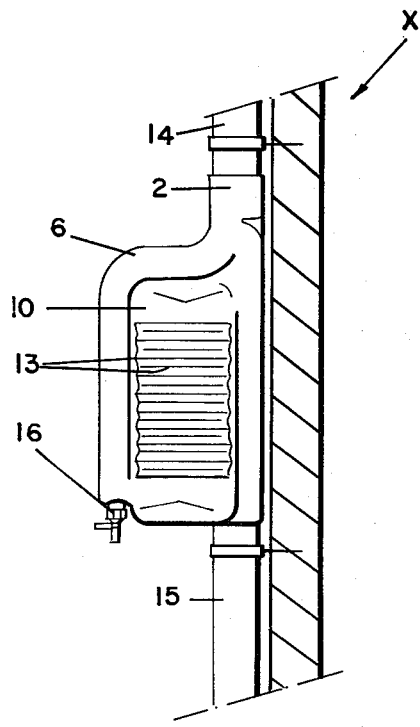
*Fig. 2*
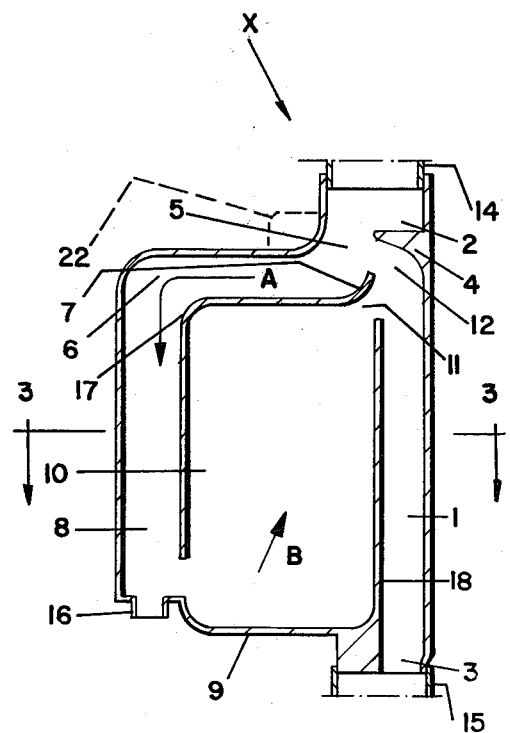
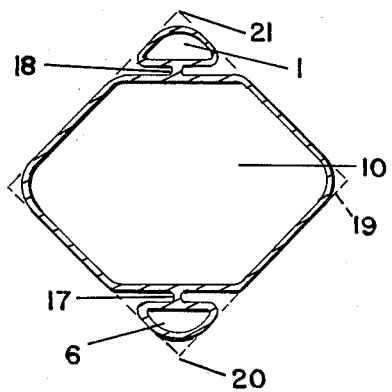
*Fig. 3*

PROCESS AND DEVICE FOR COLLECTING RAINWATER

BACKGROUND OF THE PRESENT INVENTION

The present invention relates to a process and device for collecting, storing and draining rainwater for subsequent use as well as for discharging excess quantities of rainwater above the amount desired to be collected. In conventional home roof drainage systems, rainwater flowing from roofs is collected by guttering and directed, usually, to a series of downspouts or drainpipes which direct flow to the ground, sewers or sometimes into barrels. The present invention comprises a device which can be installed directly onto downspouts after a section somewhere between the gutter and the discharge and has been removed. With the device in place, rainwater, which initially flows from the gutter down the upper part of the downspout or drain pipe connected to the device of the present invention, thereafter flows into a storage vessel located within the present invention from the bottom thereof. The vessel is provided with an openable and closeable drain to allow water to be removed from that volume collected and water in excess of that predetermined volume is discharged directly to the sewer via an overflow from that storage vessel and the lower part of the downspout.

In known rainwater collection systems water is supplied to a vessel located at the end of a downspout or drain pipe that empties directly into the top part of that storage vessel. When the vessel is full further rainwater reaching it flows, via an overflow, practically directly to the sewer.

A disadvantage of these known systems is that once water has been collected it sometimes remains in the collection vessel for long periods of time and is not automatically replaced by fresh water the next time rain fall is collected. As a result, the quality of the stored water deteriorates. The quality deteriorates even further due to the fact that as rainwater is collected in an empty or partly filled vessel, the first water collected is the most contaminated with dirt, for instance originating from the roof, while the less contaminated water that follows is discharged off the top of the vessel to the sewer.

The present invention provides a process and device for collecting, storing and draining rainwater without these disadvantages. The rainwater can still be collected via a downpipe with the flow being directed into a storage vessel provided with a drain while excess water is discharged to the sewer via an overflow. This is achieved by introducing rain water into the vessel from a point near the bottom and causing water to flow through the vessel from bottom to top with excess water overflowing from near the top so that during collection periods water flows through the vessel continuously.

A downpipe is here understood to mean a pipe in which the water moves by gravity and for installation of the present invention has been cut and a segment removed. A through pipe is here meant to be a downpipe possessing a discharge possibility apart from the vessel.

A device with a through-pipe is known from Dutch patent application No. 7,711,556, but the process carried out in that device leads to the same disadvantages described above, since the contents of the vessel cannot flow through via the line indicated by 10.

SUMMARY OF THE PRESENT INVENTION

Use of the process according to the present invention ensures that the amount of fresh rainwater collected and the through-flow of the storage vessel are at all times as large as possible. If the vessel is filled with water contaminated with roof dirt as a result of small showers, or if the vessel has for a long time been entirely or partly filled, the total contents of the vessel will be renewed the next time there is a heavy or prolonged rain. In addition, a purifying activity can take place as the water flowing over the bottom entrains the dirt settled on the bottom to the overflow. The present invention also relates to a device for carrying out the process.

This device is comprised of a storage vessel provided with a separate, closeable drain, an inlet opening in the top of the device through which the upper portion of the downspout can be passed, an overflow out of the vessel terminating in a through-pipe leading to the discharge or exit opening of the device and a lower opening of the downspout. Water flowing down the downspout is first led to one side of the inlet and then forced into a branch pipe situated further away in the direction of the flow on a side of the device. The branch pipe directs the flow toward the bottom and subsequently into the storage vessel portion of the device at a point adjacent its bottom. Therefore, water flows upwardly through the vessel, out the overflow at the top and into the through-pipe to the lower portion of the downspout. An opening is also provided to direct flow from the inlet directly to the through-pipe, if the branch pipe is clogged, thereby passing the vessel but allowing the flow of water within the drainage system to continue.

As the central axes of the inlet opening and the discharge opening are in line, the device can be incorporated in an existing rainwater discharge circuit, for instance, in a vertical rainwater downspout. For this purpose the downspout must be cut apart and a section thereof removed.

For incorporation of this device into, for instance, a vertical rainwater downspout, the upper end of the vertical through pipe or the inlet area of the device can be given a sleeve-like form to fit over the downspout, while the lower or discharge end possesses a constricted insert end to fit into the lower portion of the downspout to help assure no leakage occurs following installation of the device in the downspout.

To offer some expansion potential in the event the water contents of the vessel freeze, the side walls of the vessel can be corrugated.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The drawings forming part of this specification include:

FIG. 1, a diagrammatic side view of the device according to the invention, mounted in a rainwater pipe;

FIG. 2, a diagrammatic cross-section of the device constructed as shown in FIG. 1; and FIG. 3, a horizontal section along line III—III in FIG. 2.

DETAILED DESCRIPTION OF THE PREFERRED EXEMPLARY EMBODIMENT OF THE PRESENT INVENTION

Turning now to FIGS. 1 and 2, the preferred exemplary embodiment of the present invention is diagrammatically set forth and generally indicated by the letter X. The device is comprised primarily of a main chamber or vessel 10 situated between upper and lower portions of a down spout or drain pipe which portions are respectively indicated at 14 and 15. The vessel is provided with an inlet end 2 and a discharge end 3 which, respectively, fit together with pipe sections 14 and 15 so that rainwater can be received from pipe section 14 and discharged into pipe section 15. The vessel includes a through-pipe section 1 which together with the inlet 2 and the discharge end 3 are positioned generally in line with pipe sections 14 and 15. Overflow rain water from vessel 10 is discharged via outlet 11 provided in the upper portion of the rear wall of vessel 10 directly into through-pipe 1 with flow thereof continuing toward discharge end 3 and downspout portion 15. The overflow outlet 11 is shown in FIG. 2.

Inlet 2 includes a baffle 4 which together with the opposing side wall of the inlet portion of the device defines an inlet passage 5. Leading away from inlet passage 5 is a branch line or pipe 6 and due to the presence of baffle 4 and a collection or deflection member 7, positioned beneath passage 5 and approximately in line with baffle 4, flow is initially directed into branch pipe 6. Branch pipe 6 itself terminates adjacent the bottom of vessel 10, as shown in FIGS. 1 and 2 and will deliver rainwater flowing therethrough into vessel 10 through an opening or passage 8 positioned adjacent the bottom 9 of vessel 10. As rain falls, the flow of water will continuously occur through pipe 6, vessel 10 and out through overflow opening 11. A closeable drain device 16 is also provided adjacent the bottom of branch pipe 6 and provides a means for draining out water that has been collected within vessel 10. While vessel 10 includes overflow opening 11, an opening 12 is also defined between the end of member 7 and baffle 4 so that water can flow through the device when the branch line 6 is stopped up or flow through vessel 10 is otherwise impeded.

Preferably, pipe sections 14 and 15 are removably connected, respectively, to inlet 2 and outlet 3 so that the device can be removed, repaired and a new one installed.

Water supplied via pipe 14 is led initially by baffle 4 into the branch pipe 6 and will be fed through opening 8 into vessel 10. In this way, vessel 10 will gradually fill and when a level equal to opening 11 is reached, excess water will overflow through overflow opening 11 and discharge via through-pipe 1 and pipe section 15.

As mentioned above, should the flow branch pipe 6, as shown by arrow A, become for some reason blocked, which might occur if water in branch pipe 6 were frozen or if that pipe filled with leaves, water supplied via pipe section 14 could still flow through the device and be discharged through-pipe section 15 via opening 12 defined between member 7 and baffle 4 instead of flowing in the preferred direction through pipe 6 and storage vessel 10. Overflow 11 will also provide another discharge opening for any water that might be discharged by the freezing of contents within the device.

FIG. 3 shows a horizontal section of the device according to the preferred embodiment. The form of storage vessel 10, branch pipe 6 and the vertical through pipe 1 are such that a circumscribed imaginary rectangular parallelpiped, can be drawn around them or in that regard see dotted line 19. Branch pipe 6 is positioned along a first and the vertical through pipe 1 is positioned along a second of two diagonally opposite ribs or corners, 20 and 21, respectively.

This embodiment is particularly advantageous if the device is to be mounted on a downspout positioned in a corner formed by two walls, at the corner of a building or precisely on the partition line between two contiguous houses. In the last case, the device can be turned through a 90° angle.

The entire device can advantageously be made as an integral one piece unit from a plastic or thermo plastic material using conventional blow-molding techniques. The mold parting line of a split cavity mold can be laid in accordance with the symmetry plane drawn in FIG. 2. Starting from a tubular parison, branch pipe 6 and vertical through pipe 1 can be formed on opposite sides of vessel 10 by pressing together opposite parison walls adjacent ribs or corners 20 and 21, so that the partition walls 17 and 18 are formed. Baffle 4, too can be formed this way.

This device is mounted in a vertical rainwater downspout by pushing it up onto pipe section 14 and thereafter lowering it into position on pipe section 15 after part of the downspout has been sawn off leaving sections 14 and 15 and a distance therebetween having a height somewhat smaller than the height of the device. When installed, the vertical through pipe 1 will be in line with the downspout while the drain 16 will lie away from the building so that it can readily be operated by a user seeking to drain water collected in vessel 10.

If desired, it is also possible to incorporate the device directly as on accessories in a rainwater discharge circuit. This can, for instance, be the case if an existing downspout is positioned so that mounting of the vertical downpipe section in a line with the pipe will present problems.

If desired, the total area through which water may flow can be adapted to the existing discharge circuit. Thus, the pipe wall on the level of the baffle 4 can be locally widened, as indicated by dotted line 22 in FIG. 2.

The device is extremely suitable for collecting and storing small amounts of rainwater, for instance between about 5 and about 20 liters.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation so as to encompass all such modifications and equivalent structures.

What we claim is:

1. A device for use between upper and lower portions of a downspout for collecting, storing and discharging rainwater flowing therethrough comprised of vessel means for collecting and storing a predetermined quantity of rainwater, said vessel means having drain means for draining water therefrom, said device including means for defining entrance and exit passages with respect to said device for respectively connecting the device to said upper and lower downspout portions, said entrance passage means directing incoming rainwater toward the bottom of said vessel means, said exit passage means allowing excess rain water to be discharged from a predetermined point within the upper portion of said vessel means, said device further including means defining a through-pipe lying substantially in line with and operatively connected between said upper and lower downspout portions for receiving excess water discharged from said vessel means and for providing a passage through said device bypassing said vessel means.

2. A device as in claim 1 wherein said entrance passage means includes an entrance opening adapted to be connected to the upper portion of said downspout, a branch line extending from a point adjacent the entrance opening to a point adjacent the bottom of said vessel and baffle means for deflecting inflowing water toward said branch line.

3. A device as in claim 2 wherein said exit passage means includes a discharge opening adapted to be connected to the lower portion of said downspout, and means defining an exit opening adjacent the top of said vessel means, said through-pipe means including means defining an opening between said baffle means and said branch line so that said through-pipe means connects said entrance and discharge openings together.

4. A device as in claim 3 wherein said entrance and discharge openings have central axes that are substantially aligned.

5. A device as in claim 3 wherein said entrance and discharge openings include connection means for connecting the device to said upper and lower portions of said downspout, respectively.

6. A device as in claim 5 wherein said entrance opening is shaped as an expanded sleeve so that said upper portion is received therein and said discharge opening is constricted so as to be received within said lower portion.

7. A device as in any one of claims 1-6 wherein the vessel is provided with corrogated side walls.

8. A device as in any one of claim 1-6 wherein said drain means is positioned at the bottom of said branch line.

9. A device as in claim 7 wherein said drain means is positioned at the bottom of said branch line.

10. A device as in any one of claims 1-6 wherein said device is comprised of a plastic material.

11. A device as in claim 10 wherein said plastic material is blow molded to form said device.

12. A device as in claim 3 wherein the shape of said device is such that a circumscribed, imaginary rectangular parallelpiped can be drawn around said vessel, said branch line and said through-pipe with said branch line and said through-pipe being positioned along two diagonally opposing ribs thereof.

13. A device for collecting, storing and discharging rainwater for use with a downspout system having upper and lower sections, said device comprising a through-pipe for removably securing the device to the downspout system between the upper and lower sections, said through-pipe having entrance and exit openings, baffle means positioned adjacent said entrance opening for forming a reduced width passage within said through-pipe and for deflecting water flowing there past, means defining a branch pipe extending away from said entrance opening and said through-pipe for receiving water deflected by said baffle means, water collecting means positioned below said baffle means for collecting water flowing past said baffle means and for directing such water into said branch pipe, a storage vessel positioned adjacent both said branch and through-pipes for collecting and storing a predetermined volume of water, and drain means located at the bottom of said vessel for draining water collecting therein, said branch pipe opening into the bottom of said vessel, said device being provided with means defining at least one opening adjacent said baffle means opening into said through-pipe so that excessive water can be discharged directly into said through-pipe.

14. A device as in claim 13 wherein said at least one opening means includes means defining an opening between said water collecting means and said baffle means for connecting said entrance and exit together bypassing said vessel.

15. A process for collecting, storing and discharging rainwater through the use of a collection, storage and discharge device having a storage vessel, a branch line, a through-pipe and a drain comprising the steps of installing the device in a downspout, deflecting water continuously during collecting periods into the branch line and subsequently into and through the vessel from the bottom thereof, collecting a predetermined volume of water in the vessel, overflowing amounts of water in excess of said predetermined volume from the top of the vessel into the through-pipe and at selected intervals draining water from the vessel, including the additional step of diverting water from the entrance of the device around said vessel and directly to the downspout when flow through the branch pipe is blocked.

16. A process as in claim 15 wherein the step of deflecting water includes the steps of moving water flowing into the device toward one side of the entrance thereof and collecting water flowing along that one side in the branch line.

17. A device for insertion into a downspout for collecting, storing and discharging rainwater, said device comprising a collection and storage vessel, said vessel having an entrance opening and internal and external drain means for discharging water therefrom, said device including means defining entrance and exit openings for connecting the device to said downspout, means defining a passageway leading from said entrance opening means to the entrance opening of said storage vessel, and means defining a through-pipe spaced from said passageway means and extending between said entrance and exit opening means for receiving water discharged from said internal drain and for providing a passage through said device bypassing said storage vessel and said passageway means.

* * * * *